Figure 9:
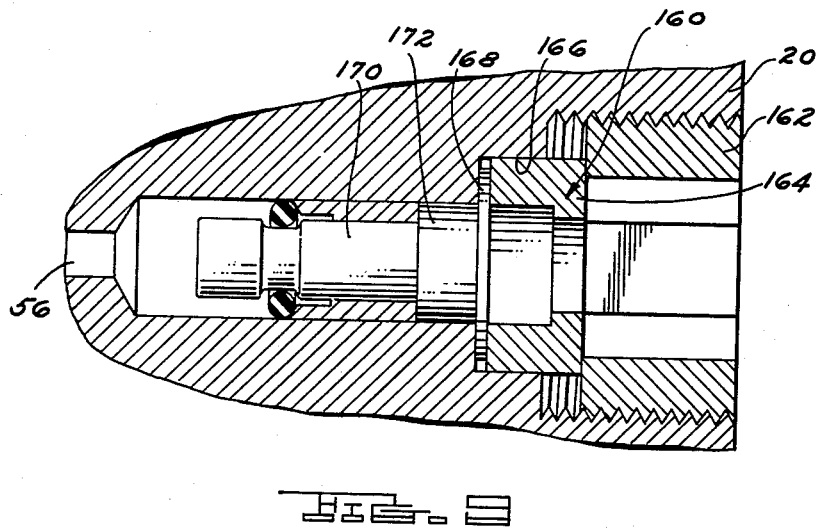

Feb. 25, 1964 G. L. ATHERHOLT, SR 3,122,376
EXPANSIBLE ARBOR
Original Filed May 4, 1962 3 Sheets-Sheet 1
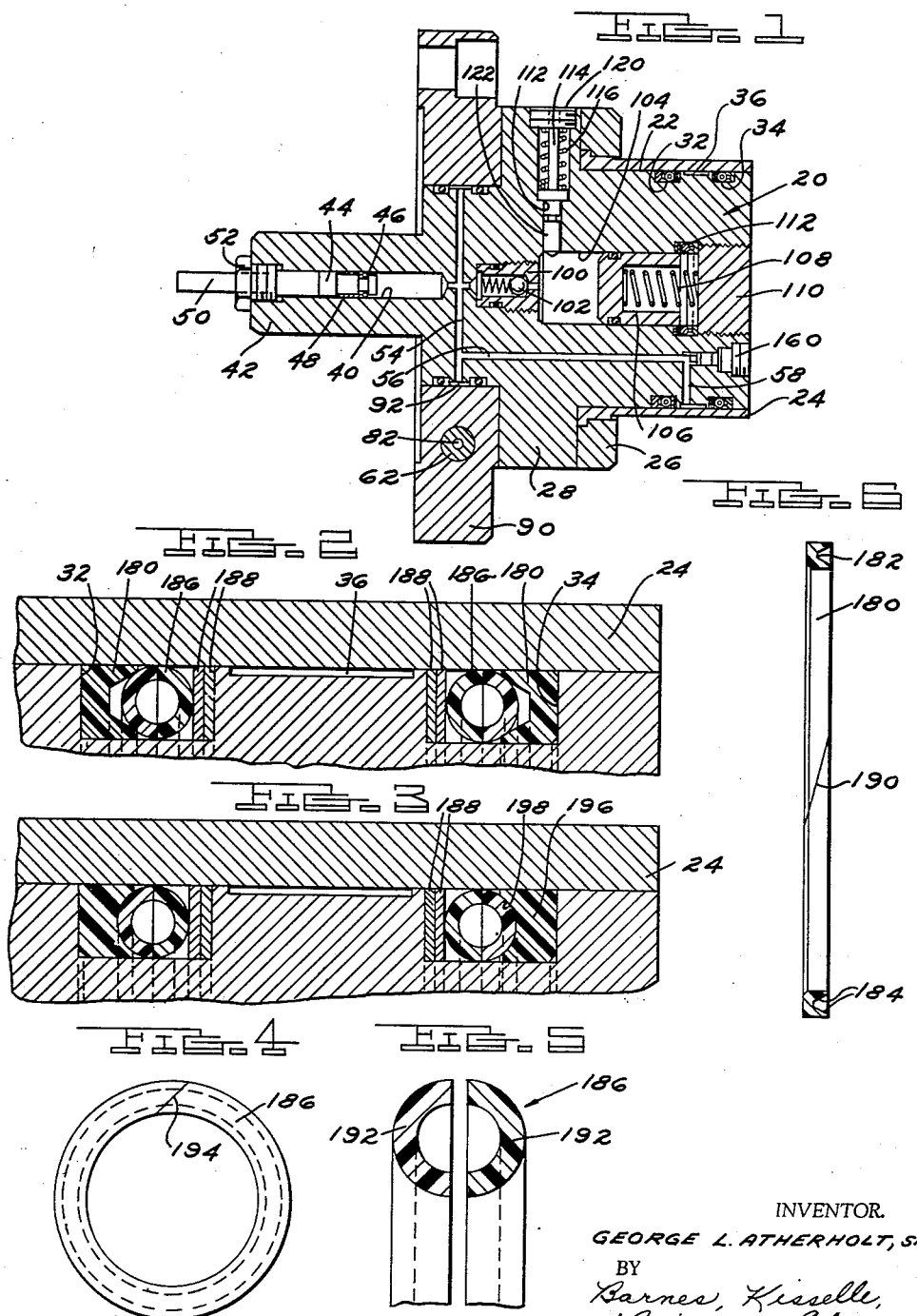
INVENTOR.
GEORGE L. ATHERHOLT, SR.
BY
Barnes, Kisselle,
Raisch & Choate
ATTORNEYS

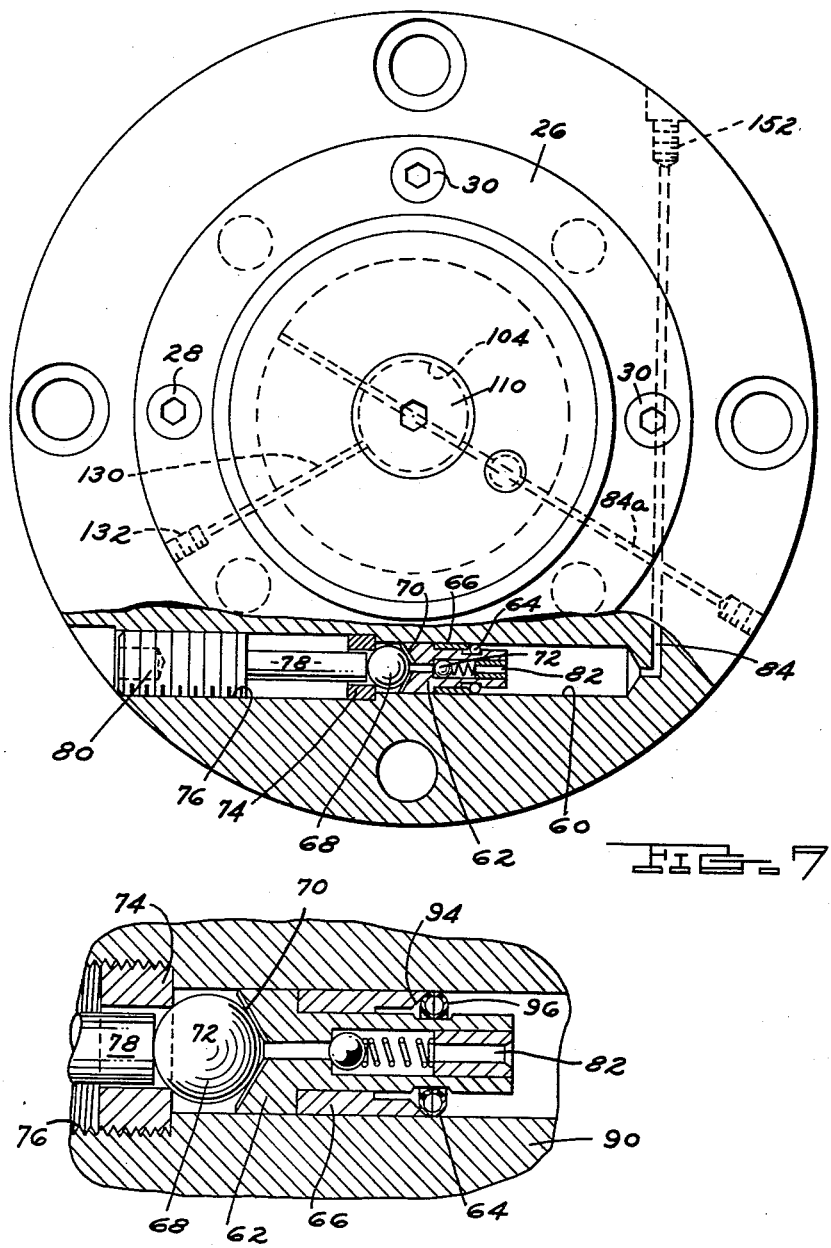

United States Patent Office 3,122,376
Patented Feb. 25, 1964

3,122,376
EXPANSIBLE ARBOR
George L. Atherholt, Sr., Warren, Mich., assignor to A and C Engineering Co., Warren, Mich., a corporation of Michigan
Original application May 4, 1962, Ser. No. 192,476. Divided and this application Nov. 5, 1962, Ser. No. 235,419
4 Claims. (Cl. 279—4)

This invention relates to a hydrostatic holding device and particularly to that type of device which is called an expanding mandrel or chuck for either external or internal holding units.

In this type of device, it is common to have a thin-walled cylinder overlying a supporting or mandrel portion with a chamber in between the two for receiving hydrostatic pressure. One of the problems in a device of this kind is the sealing of this pressure between these two parts inasmuch as there is a radial expansion of the thin-walled portion which tends to seperate it from the supporting device whether external or internal.

It is an object of the present invention to provide a sealing construction which is capable of withstanding the high pressure used in these devices without failure or wear and which is also adaptable to use on devices of small or large diameters. The sealing rings that are used on devices of large diameter can sometimes be stretched over the intervening walls of the structure to reach the annular recess in which they are located. With smaller diameters, the material is sometimes not resilient enough to stretch this distance without going beyond the elastic limit of the material. It is, therefore, an object to provide a seal which can be applied without the necessity of stretching it into place and which will yet be an effective seal.

Another problem in connection with expanding mandrels and chucks is the provision of a source of supply of material to replenish any leakage in the pressure chambers.

The present invention contemplates a source of reservoir liquid which can be supplied readily to the pressure chambers during the off pressure cycles and the invention contemplates also a convenient signal device for notifying an operator when the reservoir liquid is near exhaustion.

Another object of the invention is the provision of a selective pressure device for the application of pressure either in an axial direction actuated manually by a mechanic or mechanically with fluid pressure device, or by a separate manual device operably by the machine operator at will. With mechanisms of this kind, it is also desirable to have a safety relief mechanism as disclosed herein which will prevent excessive pressure build up due to use by an inexperienced operator. The sealing construction originally referred to can be used in a variety of ways with the constructions to be disclosed in the complete holding device, thus simplifying the construction and insuring against leakage and failure.

Other objects and features of the invention relating to details of construction and operation will be apparent in the following description and claims.

Drawings accompany the disclosure and the various views thereof may be briefly described as:

FIGURE 1, a sectional view of the entire assembly showing the relationship of the parts.

FIGURE 2, an enlarged view of the sealing mechanism for the expanding portion of the structure.

FIGURE 3, a view of a modified construction for sealing.

FIGURE 4, a view of a sealing ring showing a circumferential splicing.

FIGURE 5, a view of a sealing ring showing a join on a central plane perpendicular to the axis.

FIGURE 6, a view of a sealing ring showing a circumferential splice connection.

FIGURE 7, an end view of the construction showing the manual pressure plunger.

FIGURE 8, an enlarged view of the pressure plunger.

FIGURE 9, a view of a safety relief piston.

Figure 10:
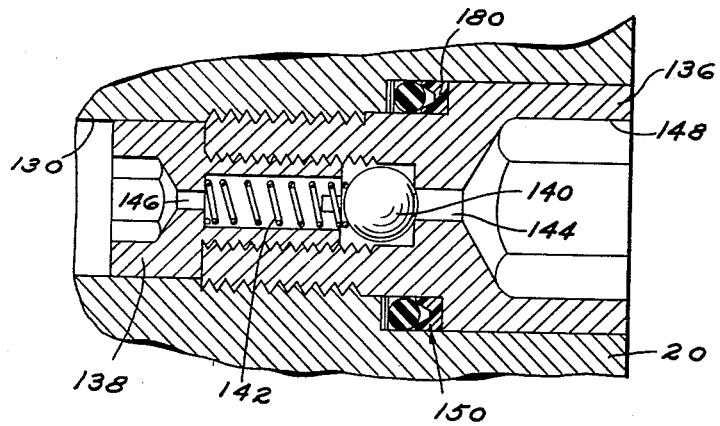

FIGURE 10, a view of a filling plug to permit the use of a quick connection lubricant supply device.

Referring to the drawings:

A holding device for work parts is shown of the type utilizing a body with a shell portion associated with a cylindrical surface thereof and radial shifting by fluid pressure in a recess between said body and said shell. In FIGURE 1, a main body portion 20 has a cylindrical surface 22 on which is telescopically fitted an expanding shell 24 held in place by a collar 26 bolted to a radial flange 28. Bolts 30 hold the collar 26 in place. The surface 22 of the body is provided with two spaced annular recesses 32 and 34 and between these recesses, and spaced therefrom, is a shallow annular chamber 36 which is actually the work chamber of the unit.

Pressure is furnished to this work chamber from a pressure bore or chamber 40 at the other end of the body formed as a bore in an axial projection 42 on said body. Disposed within the bore 40 is a pressure plunger 44, having a sealing ring 46 acting in conjunction with a sealing sleeve 48, and actuated by a plunger 50 projecting through a sealing gland or nipple 52. Pressure chamber 40 is connected through a radial passage 54 and an axial passage 56 to a short radial passage 58 leading to the work chamber 36. The plunger 50 can be actuated by a manually shifted cam or a pneumatic or hydraulic cylinder installed in the machine on which the work holder is used.

A second means of developing pressure in the work chamber is provided in a chordal bore 60 in which a plunger 62 is located having a sealing ring 64 operating against a chamfered sealing sleeve 66. The plunger 62 has a conical recess to receive a pressure ball 68, the recess being slotted at 70 to allow fluid to pass a unidirectional spring pressed ball 72. A screw collar 74 in a slightly enlarged bore 76, co-axial with bore 60, serves as a stop and retainer for the ball 68 and a guide for a pin 78 driven by a screw head 80 with a suitable screwdriver or socket opening for a tool. A central recess 82 in the plunger 62 permits the passage of fluid through the plunger if it is desired to fill the chamber in this direction through the valve 72.

A passage 84 from the pressure chamber 60 leads to the inner circumference of an adaptor ring 90 in which the bores 60 and 76 are located, this adaptor ring being mounted around the body 20 at one side of the flange 28. On the surface of the body is an annular passage 92 suitably sealed at each side which connects to the passage 54 and thence to the pressure passages leading to the work chamber. The sleeve 66 around the plunger 62 is preferably formed of a plastic material such as nylon or Teflon which has a slight resilience to it and it will be noted that the sealing ring 64 recesses into a groove formed by a chamfered wall 94 extending inwardly, the ring 64 being carried in an annular groove 96 on plunger 62 (see FIGURE 8).

The adaptor ring 90 can be of various sizes depending on the use to be made of the holding device. The cylindrical surface of the bore of the ring 90 co-operates with the grooved surface 92 of the body extension to provide an annular sealed manifold passage which connects with passage 54 and also with the separate pressure chamber 60 through passage 84.

Referring again to FIGURE 1, the body 20 has a central bore at the right-hand end which is stepped down twice, the inner and smaller end of the bore connecting with the passage 54. In the smallest and most inward portion of the bore is a unidirectional valve insert 100 which permits fluid to pass to the left past the ball 102. The intermediate portion 104 of the bore has slidably located therein a plunger 106 backed by a spring 108 retained by a plug 110 in the largest portion of the bore. A suitable sealing assembly 112 is provided ahead of the plug 110. Thus, the plunger 106 may move to the left under the urging of the spring 108.

The left-hand end of the bore portion 104 is connected by a radial passage 112 to the outside of the body 20, and in this passage, which is enlarged at its outer end, is a plunger 114 retained by a spring 116 and a retaining ring 120. The outer end of the plunger projects slidably through the ring 120. The inner end 122 of the plunger has a chamfered end which projects into the bore 104. Full movement of the piston 106 to the left will cause mechanical contact with the end 122 and a camming outwardly of the plunger 114. This will cause the outward end of the plunger to project beyond the surface of the ring 120 with which it is normally flush and will serve as a visible indicator to an operator that the chamber or bore 104 is devoid of reservoir fluid and that the device needs a refill charge.

The bore 104 can be filled by removal of the plug 110 and the piston 106 or it may be filled through a separate passage 130 (FIGURE 7) leading from the outside of the body 20 to the bore. With the bore 104 full of reservoir fluid, which in most cases is in the form of a heavy grease, this fluid will be moved by the heavy spring 108 past the ball 102 into the pressure passages 54 and the pressure chamber 40. During any off pressure cycle of the unit, the piston 106 can move liquid through the ball 102 to fill any void and replenish any leakage in the operating portion of the unit. A suitable filling plug can be used at the other end of the fill passage 130 as at 132 (FIGURE 7). A fill valve of this kind is shown in FIGURE 10 composed of two screw machine parts, an outer part 136 and an inner part 138 screwed into the inner end of the outer part. A ball check 140 is trapped between these parts backed by a spring 142 and central passages 144 and 146 permit fill fluid projected forcibly into the quick-fill opening 148 to pass the ball 140 into the passage 130. A suitable sealing device 150 is provided at the shoulder of the outer screw 136. The device might also be filled through plug 152 at the end of passage 84, FIGURE 7. This plug can be the same as that illustrated in FIGURE 10.

A safety plug can also be provided in the housing 20 shown generally at 160 in FIGURE 1. This plug is composed of an outer retaining ring 162 screwed into the housing, this ring holding a ring die 164 in a recess 166. The ring die traps an aluminum disc 168 at the bottom of the bore 166 and inside the disc is a plunger 170 having a head 172 bearing directly against the disc. Pressure on the inner end of the plunger 170 above a predetermined amount will shear the disc 168 relieving the pressure in the passage 56. Suitable stop means in ring 162 prevent ejection of plunger 170 from the body.

Various sealing devices have been referred to throughout the above description and most of these consist of two fundamental parts, a ring 180 (FIGURE 6) having a side groove 182 with converging walls 184 slanting inwardly toward each other. As shown in FIGURE 2, positioned on the groove side of the sealing ring 180 is a second ring having a circular cross section dimensioned so that the wall of the second ring 186 adjacent the ring 180 moves into the groove 182 and fits therewith to some degree.

In FIGURE 10, a similar construction is shown. Also, the various pistons described have a structure of a similar nature. For example, in FIGURE 8, the member 66 with its chamfered end 94 co-operates with the ring 96. The same is true of the structure shown in FIGURE 9.

In some cases, it is also preferable to have additional flat rings 188 disposed on the other side of the ring 186. On some diameters it is sometimes difficult to assemble these rings so that they will fit well in the annular groove in which they are to be disposed. It is essential if the ring is a closed ring that it be stretched over the adjacent part to move it into the groove. On large diameters, this is sometimes possible. On small diameters, it is difficult.

It has been found that a ring such as 180, shown in FIGURE 6, can be circumferentially spliced at 190 and still provide a suitable seal. It is possible also to make the rings 186 from tube material or a solid strand of material which can also be spliced. There is an advantage on the larger diameters in making the rings 186 of two parts 192 (see FIGURE 5) secured together by a solvent or heat weld. In FIGURE 4, the ring 186 is shown spliced at 194. In FIGURE 3, a modified construction is shown wherein the basic ring is provided with a groove which has a circular shape as shown in the ring 196 having the groove 198. These rings 180 and 196 (FIGURES 2 and 3) and the sleeve 66 (FIGURE 8) are preferably formed of a material such as nylon or Teflon which provides an excellent back-up for the so-called O-ring seal. Equal pressure on the O-ring causes an expanding pressure on the back-up member, forcing it more tightly against the surface to which it is to be sealed and also causing a radial expansion inwardly and outwardly of the basic O-ring. This combination has proved to be very effective under the high pressures required in a device of the kind described.

In the operation of the device, it will be clear that once all the passages are filled with the heavy grease or highly viscous material with all the air bled out through the various passages available for this, the openings can then all be closed and pressure applied either through the axial plunger 50 or the manual control 80, this pressure being transmitted through the passages 54 of 56 and 58 to the chamber 36 below the expanding shell 24. This puts pressure directly on the shell and moves it radially to grip a part which is supported on the shell. The equal radial and circumferential expansion will center the part exceptionally well. As previously described, excess pressure can be relieved by the safety plug 160 shown in detail in FIGURE 9 and the replenishment reservoir 104 can furnish, under the pressure of the piston 106, replenishment material through ball 102 to the operation passages.

This application is a division of my co-pending application Serial No. 192,476 on an Expansible Arbor, filed May 4, 1962.

I claim:

1. In a pressure holding device of the type utilizing a circumferential wall which is shifted radially by internal pressure which includes: a supporting body having a cylindrical surface, a movable shell fitted to said cylindrical surface, an annular chamber formed between one surface of said shell and a cylindrical surface of said body, a pressure chamber in said body, a piston movable in said pressure chamber for developing pressure therein on a fluid entrapped therein, and passageways connecting said pressure chamber and said annular chamber, that improvement which comprises:
    (a) a fluid supply reservoir in said body including a bore formed in said body,
    (b) a unidirectional valve connecting said bore with said pressure chamber to permit passage from said bore to said pressure chamber,
    (c) means for filling said reservoir, and
    (d) a resiliently biased piston in said reservoir for urging fluid in said bore toward said unidirectional means under predetermined pressure.

2. A device as defined in claim 1 in which an indicator means in said body comprises:

(a) a plunger extending radially in said body having an inner end projecting into said bore, and (b) means on said plunger visible at the surface of said body, said inner end being disposed in the path of said biased piston wherein it will be mechanically urged radially outward upon motion of said piston a predetermined distance in said bore to provide visual evidence of said motion.

3. A device as defined in claim 2 in which a relief piston is included comprising:

(a) a stepped bore formed in said body connected to the pressure passages in said body, (b) a piston in said stepped bore having a portion receivable into the smaller area of said stepped bore, (c) a shear disc in said stepped bore disposed to have a portion urged outwardly by said piston, (d) a die ring confining the outer annular portions of said shear disc, and (e) means retaining said die ring in said stepped bore wherein pressure on said piston above a predetermined amount will shear said disc against said die ring to relieve the pressure in said body.

4. In an expanding arbor of the type having a relatively thin cylindrical member associated with a supporting body, a cylindrical extension at one end of said body, an adaptor ring to fit closely over said cylindrical extension so that the contacting surfaces are in close relation, at least one of said surfaces having an annular groove around to form, with the other of said surfaces, an annular passage, a pressure forming chamber in said body to provide pressure to said thin cylindrical member for expansion purposes, and means in said body to connect said pressure forming chamber to said annular passage, and means in said adaptor ring for forming a pressure chamber comprising:

(a) a bore in said ring, (b) means movable in said bore to ensmall the volume thereof, and (c) means connecting said bore with said annular passage wherein fluid under pressure may be transmitted to said passage from said bore or from said pressure forming chamber in said body.

References Cited in the file of this patent

UNITED STATES PATENTS

| | | |
|---|---|---|
| 2,942,891 | Zale | June 28, 1960 |
| 2,963,298 | Better | Dec. 6, 1960 |
| 3,034,408 | Kampmeier | May 15, 1962 |

FOREIGN PATENTS

| | | |
|---|---|---|
| 1,008,545 | Germany | May 16, 1957 |